United States Patent [19]

Foster

[11] Patent Number: 4,740,550

[45] Date of Patent: Apr. 26, 1988

[54] MULTISTAGE COPOLYMERIZATION PROCESS

[75] Inventor: E. Gordon Foster, Houston, Tex.

[73] Assignee: Shell Oil Company, Houston, Tex.

[21] Appl. No.: 875,830

[22] Filed: Jun. 18, 1986

[51] Int. Cl.$^4$ .......................... C08F 297/08; C08F 8/00
[52] U.S. Cl. ........................................ 525/52; 525/53; 525/243; 525/323
[58] Field of Search ...................... 525/52, 53, 243, 323

[56] References Cited

U.S. PATENT DOCUMENTS

| | | |
|---|---|---|
| 3,200,173 | 8/1965 | Schilling . |
| 3,318,976 | 5/1967 | Short . |
| 3,437,646 | 4/1969 | Scoggin . |
| 3,514,501 | 5/1970 | Leibson et al. . |
| 3,622,553 | 11/1971 | Cines ..................................... 525/53 |
| 3,732,335 | 5/1973 | Hermans et al. . |
| 3,995,097 | 11/1976 | Brown et al. . |
| 4,068,054 | 1/1978 | Willcox . |
| 4,182,810 | 1/1980 | Willcox . |
| 4,297,445 | 10/1981 | Short et al. . |
| 4,380,608 | 4/1983 | Hasus et al. . |
| 4,543,389 | 9/1985 | Burstain et al. . |

FOREIGN PATENT DOCUMENTS 0037291 10/1981 European Pat. Off. ............ 525/323

OTHER PUBLICATIONS

"Toughened Plastics", C. B. Bucknall, *Applied Sci. Publishers Ltd.*, 1977, pp. 87–90.

T. G. Heggs in Block Copolymers, D. C. Allport & W. H. James (eds.), *Applied Sci. Publishers Ltd.*, 1973, chap. 4.

*Primary Examiner*—Wilbert J. Briggs, Sr.

[57] ABSTRACT

The present invention relates to a multistage, continuous process for the preparation of propylene-ethylene impact copolymers comprising the use of a recirculating pipe-loop reactor for homopolymerizing propylene, a cyclone separator for removing fines, a gas-phase fluidized bed reactor for additional propylene homopolymerization, and a gas-phase fluidized bed reactor for propylene/ethylene copolymerization.

16 Claims, 1 Drawing Sheet

MULTISTAGE COPOLYMERIZATION PROCESS

FIELD OF THE INVENTION

The present invention relates to a multistage process for the preparation of propylene-ethylene impact copolymers. More particularly, the present invention relates to a process for the preparation of propylene-ethylene impact copolymers employing one or more pipeloop reactors, a second stage fluidized bed homopolymer reactor and a third stage fluidized bed copolymer reactor.

BACKGROUND OF THE INVENTION

Polypropylene is a well known commercial polymer, used for a variety of products such as packaging films and extruded and molded shapes. It is produced by polymerization of propylene over transition metal coordination catalysts, specifically titanium halide containing catalysts. Commercial polypropylene is deficient in resistance to impact at low temperatures, i.e., 0° C. and below. It is known that incorporation of some elastomers, particularly elastomeric copolymers of ethylene and propylene, improves the low temperature impact resistance of polypropylene.

One method of incorporating elastomeric ethylene-propylene copolymers into polypropylene is by sequential polymerization of propylene and ethylene-propylene mixtures. In typical processes of this kind, propylene homopolymer is formed in one stage and the copolymer is formed in a separate stage, in the presence of the homopolymer and of the original catalyst. Multiple stage processes of this type are also known. Products of such sequential polymerization processes are sometimes referred to as "block copolymers" but it is now understood that such products may rather be intimate blends of polypropylene and ethylene-propylene elastomer. The products of such sequential polymerization of propylene and ethylene-propylene mixtures, are referred to herein as sequentially polymerized propylene-ethylene copolymers or as in-situ produced copolymers. To maintain separate terminology for the total sequentially polymerized copolymer composition and the elastomeric copolymer fraction thereof, the total copolymer composition is referred to as impact-improved propylene-ethylene copolymer which has a specified content of an elastomeric ethylene-propylene copolymer fraction and which is the product of sequential polymerization of propylene and a propylene-ethylene mixture.

Methods for producing impact-improved, sequentially polymerized propylene-ethylene copolymers are well known. See, for example, "Toughened Plastics" by C. B. Bucknall, Applied Science Publishers Ltd. 1977, pp. 87–90, and T. G. Heggs in Block Copolymers, D. C. Allport and W. H. James (eds), Applied Science Publishers Ltd, 1973, chapter 4. Representative U.S. patents describing such methods are: U.S. Pat. Nos. 3,200,173—Schilling; 3,318,976—Short; 3,514,501—Leibson et al; 4,543,389—Burstain et al; 4,380,608—Hasuo et al; and 4,297,445—Short et al.

A new process for the preparation of propylene-ethylene impact copolymers has been found that has certain important advantages over the prior art.

SUMMARY OF THE INVENTION

The present invention relates broadly to a novel process for preparing propylene-ethylene impact copolymers. In particular, the present invention relates to a continuous process for the preparation of propylene-ethylene impact copolymers.

The objectives of the process of this invention are to:

(a) Produce a high quality impact copolymer with a good balance of impact strength and stiffness.

(b) Produce a product with a high ratio of intrinsic viscosity of the rubber fraction to intrinsic viscosity of the homopolymer fraction, typically 3 or greater.

(c) Produce a product where the rubber particles dispersed in the homopolymer are optimally 1 to 3 microns in diameter, with particular avoidance of larger rubber particles, so-called "gel" particles.

(d) Produce the product at a cost not significantly greater than the cost of homopolymer produced by the best state of the art technology.

(e) Minimize heat requirements for vaporizing monomers from the product by utilizing the heat of polymerization to provide heat for vaporizing monomer.

(f) Minimize heat requirements for separating ethylene and propylene monomers by feeding to the copolymer reactor stage only the amount of propylene and ethylene which can be completely reacted to produce the desired quantity of "rubber fraction", thus avoiding the separation and recycling of excess unreacted monomers.

(g) Obtain as high a yield as possible, lbs. of polypropylene per lb. of catalyst.

(h) Provide for removal of a large fraction of the hydrogen in the copolymer reactor stage to increase the molecular weight (or intrinsic viscosity) of the rubber fraction relative to that of the homopolymer fraction.

(i) Provide in the fluidized-solid gas-phase reactors vapor distribution and powder separation systems that avoid "dead" areas where hot spots can form.

(j) Provide as feed to the fluidized-solid gas-phase reactors a partially polymerized product without excessive powder fines.

(k) Provide for final separation of residual monomers from polypropylene copolymer powder with as little loss of monomers as possible.

One of the problems in meeting these objectives is the broad distribution of particle residence times in continuous reactors. In well mixed continuous reactors the residence time of individual particles may vary from nearly zero to infinity, depending upon the probability of an individual particle exiting the reactor. The problem may be illustrated by considering sequential homopolymerization and copolymerization steps in sequential well mixed homopolymer and copolymer continuous reactors. Particles which have a relatively short residence time in the homopolymer reactor and a long residence time in the copolymer reactor will have a relatively low content of homopolymer and a high content of copolymer, or "rubber". The problem is exaggerated by the relatively high initial activity of the catalyst followed by a relatively rapid initial loss of catalyst activity with time. Any particle exiting from the reactor after a very short residence time, while the catalyst is still very active, will tend to subsequently form a large amount of copolymer, or "rubber".

Computer models were constructed based on reaction rate data, and used to simulate various process configurations. A typical process configuration, as used commercially, would be a well mixed homopolymer reactor, followed by a well mixed copolymer reactor. A simulation of this configuration for production of a product containing an average of 15% copolymer, or "rubber", and 85% homopolymer, indicates that over 60% of the total rubber content will be in individual particles in which the rubber content is over 50%. Because of phase inversion, in which the rubber phase becomes the continuous phase because of the high rubber content, these particles tend to subsequently agglomerate into large rubber particles, or "gel particles", much larger than the optimum size of 1 to 3 microns. These large rubber particles can be broken into smaller rubber particles by subsequent extrusion only if the ratio of intrinsic viscosities of the rubber and homopolymer phases is reduced to 1.5 or less, much lower than the optimum value of 3 or greater.

The problem described above is not encountered in batch processes where all of the particles have the same residence time. However, batch processes are relatively inefficient and expensive. It is the goal of this invention to achieve the desired objective using continuous processing, without a solvent other than propylene, and without supplying substantial external heat to remove solvent from polymer.

This objective can be achieved by the present invention comprising the following steps:

(a) homopolymerizing propylene in one or more recirculating pipe-loop reactors in the presence of a liquid, or high density supercritical phase, comprising propylene monomer as a major constituent, and in the presence of a magnesium chloride and titanium-containing catalyst, resulting in a homopolymer slurry;

(b) transferring said homopolymer slurry to a separator and separating a fines stream having a particle size below about 10 to 30 times the diameter of the catalyst particles, (preferably 15 to 20 times) resulting in a reduced-fines homopolymer slurry;

(c) transferring said reduced-fines homopolymer slurry to a gas-phase fluidized bed homopolymer reactor and homopolymerizing additional propylene;

(d) removing a stream of propylene homopolymer particles from said gas-phase fluidized bed homopolymer reactor and transferring the stream to a gas-phase fluidized bed copolymer reactor;

(e) copolymerizing ethylene and propylene in said copolymer reactor, resulting in a propylene-ethylene impact copolymer;

(f) removing said propylene-ethylene impact copolymer from said copolymer reactor.

The particles in the fines stream separated in step (b) above are principally a result of a short particle residence time in the pipe-loop reactor, except for a small amount of fine particles formed by attrition. The fines stream will be optimally recycled back to the pipe-loop reactor, except for a small reject purge stream which may be removed to reject fines formed by attrition. The reject fines may be combined with the final propylene-ethylene impact copolymer product. Alternatively, the reject fines may be blended with a separate homopolymer product.

The actual size of the particles in the fines stream will depend upon original catalyst particle size and the activity of the catalyst. It is desired to separate and recycle all fine particles where the residence time in the pipe-loop reactor has been insufficient to allow the particle to grow to a minimum desired size of particle, and a minimum ratio of weight of contained polymer per weight of contained catalyst. The object is to remove and recycle fine particles back to the pipe-loop reactor so that most of the particles in the reduced-fines stream fed to the gas-phase fluidized bed homopolymerization reactor have sufficient residual catalytic activity to complete the subsequent homopolymerization and copolymerization steps before the activity of the catalyst is exhausted, and that as few particles as possible have an excess of residual catalytic activity.

As an example, if the average weight ratio of polymer to catalyst in the homopolymer stream leaving the pipe loop reactor is 14,000, the desired weight ratio of the polymer to catalyst in the particles in the fines stream might be set at 10,000 or less. Because the density of the catalyst is approximately twice the density of the polymer, the corresponding volume ratio would be 5,000, and the corresponding ratio of polymer particle diameter to the diameter of the original catalyst particle would be the cube root of 5,000, or 17. If the diameter of the catalyst particle were 25 microns, the diameter of the removed particles in the fines stream would then be set at 17 times 25, or 425 microns, or less.

Other objects and advantages will be apparent from the detailed discussion below of the invention.

DETAILED DESCRIPTION OF THE INVENTION

Figure 1:
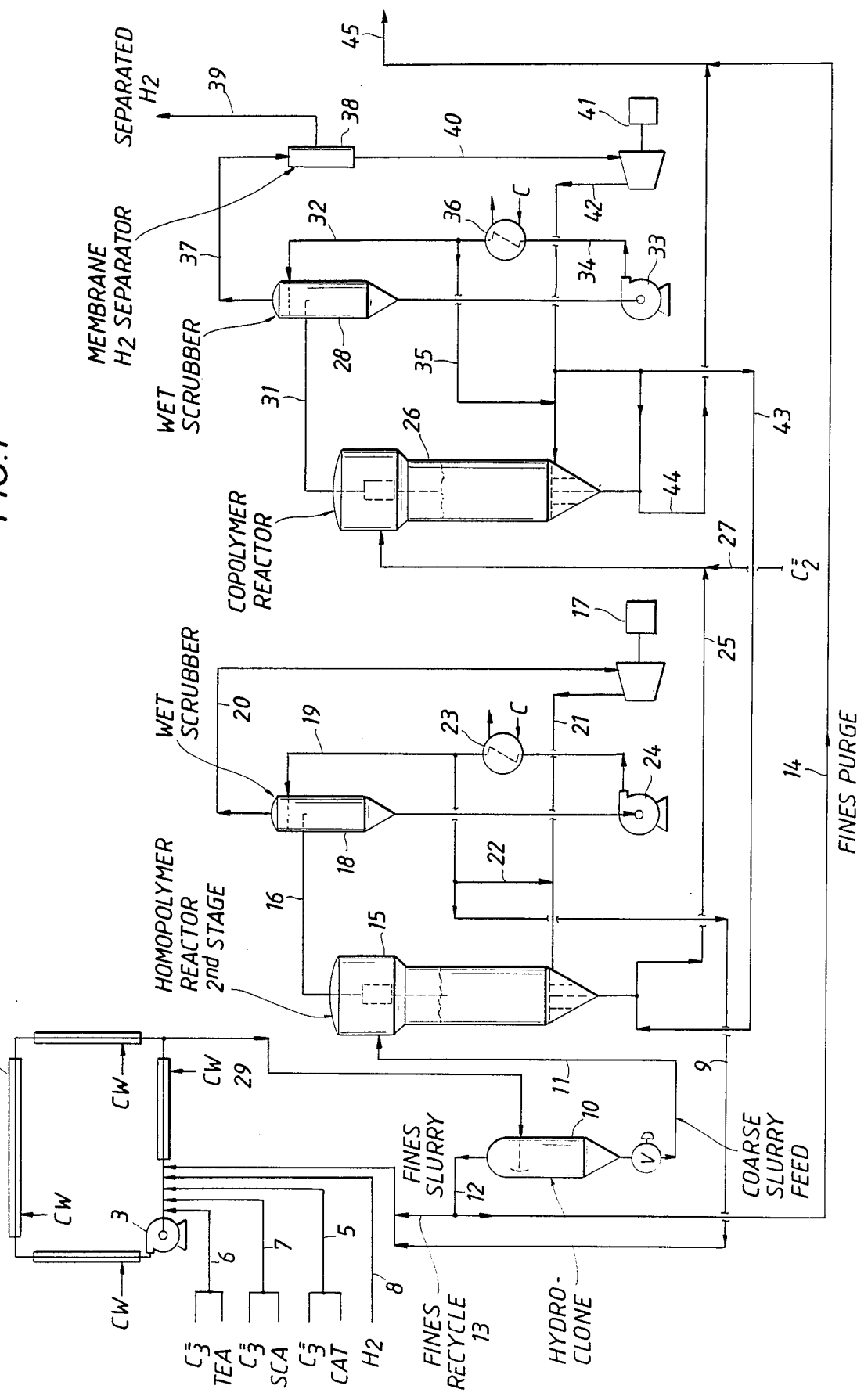
FIG. 1 is a schematic view of the process according to the present invention.

The present invention is directed primarily to a multi-stage polymerization process for preparing propylene-ethylene impact copolymers. There are a number of key aspects to the present invention. Primary aspects are the use of one or more pipe-loop homopolymer reactors in conjunction with a second-stage fluidized-bed homopolymer reactor to prepare the propylene homopolymer portion. The ethylene-propylene rubber portion is prepared in a third-stage fluidized-bed copolymer reactor.

A typical design of a pipe-loop reactor is based on a production rate of 200 MM lbs/yr of propylene-ethylene impact copolymer. Of this amount, 69%, or 138 MM lbs/yr, or 17,000 lbs/hr is made in the pipe-loop reactor. The product from this reactor is a 40% slurry containing 25,000 lb/hr of homopolymer. Of this amount, 8,000 lb/hr is separated as a fines stream and is recycled, and 17,000 lbs/hr is net product that is fed to the gas-phase homopolymer reactor. Assuming a slurry concentration of 40%, a 10 minute residence time in the pipe-loop reactor, and the use of 6 inch diameter schedule 40 pipe, we require a pipe-loop reactor having a length of 1336 ft. Further, assuming a velocity of 25 ft/sec in the pipe-loop reactor, we require a recirculation rate of about 2250 gallons per minute. The pipe-loop reactor is typically jacketed with cooling water flowing through the outside walls.

One or more (e.g. 2 or 3) pipe-loop reactors may be used. Preferably only one pipe-loop reactor is used.

Two fluidized bed reactors are employed in the process of the present invention--one as a second-stage homopolymer reactor and one as a third-stage copolymer reactor. Particulars of the fluidized bed reaction system are disclosed in Union Carbide U.S. Pat. No. 4,543,399, which disclosure is herein incorporated by reference.

The advantage in using a second stage gas phase homopolymer reactor is that all of the excess propylene will be vaporized and removed by the heat of reaction. This will eliminate the need for a separate propylene recovery step either before or after the copolymerization step. A second advantage is that a second homopolymerization step provides an additional reactor stage which further narrows the residence time distribution of homopolymer particles subsequently fed to the copolymerization step, and thus helps narrow the distribution of the rubber content of the copolymer particles.

In the past, the conventional catalyst system used has been an unmodified or an electron donor-modified titanium halide component, activated with an organoaluminum cocatalyst. Typical examples of conventional propylene polymerization catalyst systems include cocrystallized titanium trichloride-aluminum trichloride catalysts of the general formula n.TiCl$_3$AlCl$_3$ activated with diethylaluminum chloride or triethyl aluminum. The cocrystallized titanium trichloride-aluminum trichloride may also be subjected to a modification treatment with a suitable electron donor compound to increase its activity or stereospecificity. Such compounds include phosphorus compounds, esters of inorganic and organic acid ethers and numerous other compounds.

One major drawback, however, in using the aforementioned conventional catalysts, has been the low catalyst productivity, which has necessitated the subsequent deashing of the product to reduce the content of catalyst residues, which otherwise would detrimentally affect the product quality.

Recently new catalysts have been developed which are far more active than the aforementioned conventional catalysts in the polymerization of alpha-olefins. These olefin polymerization catalysts are prepared by combining a solid component comprising at least magnesium, titanium and chlorine with an activating organoaluminum compound. These may be referred to as supported coordination catalysts or catalyst systems. The activity and stereospecific performance of such compositions is generally improved by incorporating an electron donor (Lewis base) in the solid component and by employing as a third catalyst component an electron donor which may be complexed in whole or in part with the activating organoaluminum compound.

For convenience of reference, the solid titanium-containing constituent of such catalysts is referred to herein as "procatalyst", the organoaluminum compound, whether used separately or partially or totally complexed with an electron donor, as "cocatalyst", and the electron donor compound, whether used separately or partially or totally complexed with the organoaluminum compound, as "selectivity control agent" (SCA).

The procatalysts which are employed in the catalyst system in this invention may be produced by methods known in the art. These procatalysts are any one of the recently developed, high activity magnesium halide supported catalyst components disclosed e.g., in U.S. Pat. Nos. 3,953,414, 4,051,313, 4,115,319, 4,149,990, 4,211,339, 4,220,554, 4,226,741, 4,263,169, 4,329,253, 4,400,302 and 4,414,132, hereby incorporated in this application by reference.

In general these procatalysts are referred to as "magnesium chloride and titanium-containing catalysts'—i.e., MgCl$_2$-TiCl$_4$ catalysts. These procatalysts typically also contain an "inside" electron donor. Suitable electron donors which are used in the preparation of the solid catalyst component are ethers, esters, ketones, phenols, amines, amides, imines, nitriles, phosphines, phosphites, stibines, arsines, phosphoramides and alcoholates. Examples of suitable donors are those referred to in U.S. Pat. No. 4,136,243 or its equivalent British Specification No. 1,486,194 and in British Specification No. 1,554,340 or its equivalent German Offenlegungsschrift No. 2,729,126. Preferred donors are esters and diamines, particularly esters of aromatic carboxylic acids, such as ethyl and methyl benzoate, p-methoxy ethyl benzoate, p-ethoxy ethyl benzoate, p-ethoxy methyl benzoate, ethyl acrylate, methyl methacrylate, ethyl acetate, dimethyl carbonate, dimethyl adipate, dihexyl fumarate, dibutyl maleate, ethylisopropyl oxalate, p-chloro ethyl benzoate, p-amine hexyl benzoate, isopropyl naphthenate, n-amyl toluate, ethyl cyclohexanoate, propyl pivalate, N,N,N',N'-tetramethylethylene diamine, 1,2,4-trimethyl piperazine, 2,3,4,5-tetraethyl piperidiene and similar compounds. Preferred electron donors for use in preparing the titanium constituent are ethyl benzoate or diisobutyl phthalate.

The organoaluminum compound to be employed as cocatalyst may be chosen from any of the known activators in olefin polymerization catalyst systems comprising a titanium halide but is most suitably free of halogens. While trialkylaluminum compounds, dialkylaluminum halides and dialkylaluminum alkoxides may be used, trialkylaluminum compounds are preferred, particularly those wherein each of the alkyl groups has 2 to 6 carbon atoms, e.g., triethylaluminum, tri-n-propylaluminum, triisobutylaluminum, triisopropylaluminum and dibutyl-n-amylaluminum.

Preferred proportions of selectivity control agent, employed separately, in combination with, or reacted with an organoaluminum compound, calculated as mol per mol aluminum compound, are in the range from 0.1 to 1.5, particularly from 0.2 to 0.5.

Proportions of electron donor contained in the solid catalyst component, calculated as mol per mol of magnesium, are suitably in the range from 0.01 to 10, e.g., from 0.01 to 10 and from 0.05 to 5.0 and especially from 0.05 to 0.5.

The electron donor used as SCA may be the same, but is preferably different from the "inside" electron donor. Preferred SCAs are p-ethyl anisate and p-ethyl ethoxy benzoate and certain silane compounds.

To prepare the final polymerization catalyst composition, procatalyst, cocatalyst and selectivity control agent, are fed to the 1st stage reactor, most suitably employing a molar ratio to produce in the final catalyst an atomic ratio of aluminum to titanium of from 1 to 150, and suitably from about 10 to about 150. The catalysts of this invention tend to exhibit very good activity at much lower Al:Ti ratios, e.g., below 80:1 and even below 50:1, than prior art catalysts of the same type. It may, however, be advantageous under some conditions to employ them at higher Al:Ti ratios. Increasing the Al:Ti ratio tends to increase catalyst activity at the expense of increased catalyst residue in the unextracted product. These factors, as well as the desired level of isotacticity, will be considered in selecting the Al:Ti ratio for any given process and desired product. In general, Al:Ti ratios in the range of 30:1 to 100:1 and especially of about 50:1 to 80:1 will be found advantageous.

Another important aspect of the present invention deals with the relative amount of polymer produced in each of the various stages. Regarding the homopolymer portion of polymer, the following ranges (in percent by weight) are preferred:

|   | Preferred | Most Preferred |
| --- | --- | --- |
| 1st stage pipe-loop reactor | 50 to 95 | 70 to 90 |
| 2nd stage fluidized-bed reactor | 50 to 5 | 30 to 10 |
| TOTAL | 100% | 100% |

The copolymer (ethylene-propylene copolymer) portion of the impact copolymer typically comprises 10 to 20, preferably 12 to 17 weight percent of the total polymer composition.

Impact-resistant polymers made by this process that are of the most interest have the following general properties: melt flow (ASTM D 1238, Condition L), g/10 minutes ranging from about 0.1 to about 20, flexural modulus (ASTM D 790) ranging from about 80,000 to about 200,000 psi (550 to 1380 MPa), brittleness temperature (ASTM D 746) ranging from about $-55°$ F. ($-48°$ C.) to about 30° F. ($-1°$ C.) and densities ranging from about 0.88 to about 0.91 cc/g. Polymers with properties outside of these ranges can be made by manipulating residence times in each reactor, polymerization temperature, hydrogen concentration and the like as is well known in the art.

In general the catalyst systems and other conditions used in the individual reaction stages of this invention are well known in the art. The advantages obtained from this invention are generally provided from the particular type of reaction stages employed and their sequence.

Although the reaction conditions are well known and do not in themselves form an essential part of the invention, for the sake of clarity the general ranges for the reaction conditions are recited below:

I. First stage reaction conditions
temperature, °C.: 67
pressure, psia: 422
residence time, minutes: 10
II. Second stage reaction conditions
temperature, °C.: 70
pressure, psia: 300
residence time, minutes: 15
III. Third stage reaction conditions
temperature, °C.: 70
pressure, psia: 150
residence time, minutes: 75
ethylene/propylene gas mole ratio: 0.54

DETAILED DESCRIPTION OF THE INVENTION AS IT RELATES TO FIG. 1

Referring to FIG. 1, propylene homopolymer is first polymerized in the liquid state in a pipe loop (1) reactor system. Pump 3 is provided for circulation and is preferably an axial flow or mixed flow pump to minimize fouling. The pipe loop reactors are recirculating jacketed pipe reactors, similar to those disclosed in U.S. Pat. Nos. 3,437,646; 3,732,335; 3,995,097; 4,068,054 and 4,182,810. Heat is removed by a cooling water jacket and cooling water is denoted "CW" in the FIG. 1. The pressure is maintained sufficiently high to suppress vaporization. If the pressure is above the critical temperature of propylene (197° F.), the pressure is maintained high enough to obtain a fluid density sufficient to facilitate pumping and slurry suspension. As an illustrative example, the temperature and pressure might be set at 200° F. and 700 psig, respectively, which are above the critical temperature and pressure of propylene.

One reason for operating at a relatively high temperature, besides facilitating heat removal and providing a simpler and smaller reactor, is that a better homopolymer product might be produced. Trends previously observed indicate that higher temperatures reduce the xylene solubles content of the homopolymer. Hopefully, the stiffness of the homopolymer might also be improved. Significantly higher temperatures than the 156° F. currently practices are not possible with a refluxed-cooled reactor, but would be possible with the reactor described here.

Magnesium supported procatalyst ("cat") (which catalyst may optionally be pretreated with materials such as diethylaluminum chloride) are mixed with a portion of the liquid propylene feed and fed to the reactor via line 5. Other portions of the propylene feed are separately premixed with the cocatalyst (e.g. triethyl aluminum or "TEA") and selectively control agent ("SCA") and fed to the reactor via lines 6 and 7 respectively. Hydrogen, both makeup and recycle hydrogen, are fed to control the molecular weight (or intrinsic viscosity) of the homopolymer via line 8.

If advantageous, an alternative catalyst feed system might be used in which the supported catalyst is first pretreated with a low concentration of propylene and triethylaluminum in propane. Pretreatment with TEA and propylene might be carried out in a stirred jacketed vessel, or a recirculated jacketed pipe exchanger.

Because a high propylene fugacity (or high pressure) increases the yield of polypropylene per lb of catalyst, as much as possible of the homopolymerization is optimally carried out in the first reactor stage. This is facilitated by recycling liquid monomer from the second homopolymer reactor stage back to the first reactor stage, via line 9. Polymer slurry is passed from the first stage to the second stage via line 29.

A liquid centrifugal separator or cyclone (10) is provided in the circulation loop to retain fines as overflow, and pass course slurry (via line 11) to the next reactor stage. In this way, by-passing of under-utilized catalyst particles (which are smaller than more fully utilized catalyst-polymer particles) is avoided. Most of the fines (line 12) are recycled to the first stage reactor via line 13. However, a portion of the fines is purged via line 14 to be blended with the copolymer from the reactor.

Course homopolymer slurry and partially utilized catalyst from the pipe loop reaction stage are fed to the second stage reactor (15). The latter is a gas-phase fluidized-solid reactor. This reactor serves not only as a second stage reactor, but provides heat of polymerization to vaporize unreacted propylene from the second reaction stage. It also provides partial pressure letdown, which in turn decreases the propylene vapor density, and thus the amount of propylene entrained in the void spaces of the homopolymer powder fed to the copolymer reactor. In this way, the amount of propylene fed to the copolymer reactor is limited to the amount needed for the copolymer reaction only, thus avoiding subsequent separation of unreacted propylene from ethylene.

Homopolymer powder and partially utilized catalyst are maintained in a fluidized solid state by recirculation of propylene vapor (line 16) with a recycle compressor (17). The reactor has a conical bottom, and vapor is distributed to the bottom of the reactor with a manifolded vertical pipe distributor, with the open ends of the distributor pipes pointed down in close proximity to the bottom conical surface of the reactor. Overhead vapor from the reactor is separated from homopolymer powder in an enlarged section of the reactor, and in a cyclone separator in the upper portion of the reactor. Catalyst and polymer fines are further removed from the gas stream by scrubbing in the wet scrubber (18) with recirculated condensed propylene (19). The vapor (20) is then compressed and recirculated to the reactor via line 21. Condensed propylene containing fines are recirculated via pump 24 to the first stage reactor via line 9, or optionally, back to the second stage reactor via line 22.

Cooling in the second reactor is provided by vaporization of unreacted propylene from the second stage, cooling of recycle vapor in condenser 23, and if desired, recycle of condensed propylene.

Course homopolymer powder, containing propylene vapor in the powder voids, is fed to the copolymer reactor via line 25.

In order to avoid propylene recovery and separation from ethylene, it is desired to transfer from the homopolymer reactor to the copolymer reactor only that amount of propylene which will be essentially completely reacted in the copolymer reactor. Thus, if the final copolymer is to contain 80% homopolymer, and 20% rubber fraction containing 40% propylene, only 0.1 lbs of propylene per lb of homopolymer ($0.4 \times 0.2/0.8$) should be transferred. To hold to this limit, both the bulk density of the fluidized powder and the propylene gas density should be controlled. For example, if the bulk density of the fluidized powder being transferred from the solids classifier to the copolymer reactor is 14 lbs/cu. ft, the propylene gas density in the powder voids should preferably be no more than 1.86 lbs/cu. ft. At a temperature of 160° F., this propylene gas density corresponds to a pressure of 250 psia. However, the pressure and gas density can be higher if the bulk density of the powder being transferred is higher than 14 lbs/cu. ft., or if some propylene recovery and separation is provided downstream from the copolymer reactor.

The copolymer reactor 26 is a gas-phase fluidized-solid reactor similar in configuration to the second stage homopolymer reactor. Homopolymer powder, partially utilized catalyst, and entrained propylene from the second stage homopolymer reactor, along with a separate ethylene feed 27, are fed to this reactor. As in the third stage homopolymer reactor, fluidization of copolymer powder is obtained by recirculation of monomer vapor. Deentrainment of solids from vapor is provided by an enlarged upper reaction section, a cyclone separator, and a wet scrubber 28. Cooling is provided by gas cooling and by condensation and recycling of condensed monomers. The vapor composition in the reactor is typically maintained at about 35% volume ethylene and 65% propylene. This will produce a rubber copolymer fraction containing about 55–60% weight ethylene and 40–45% propylene. The weight fraction of rubber in the copolymer will typically be about 0.15 to 0.25.

Overhead 31 from the copolymer reactor is passed through the wet scrubber 28 where catalyst and polymer fines are further removed from the gas stream by scrubbing with recirculated condensed propylene/ethylene-32. Condensed propylene/ethylene containing fines are recirculated via pump 33 to the copolymer reactor via lines 34 and 35.

Cooling the third stage copolymer reactor is provided by vaporization of unreacted propylene in the fourth stage and cooling of recycle vapor in condenser 36.

Because a relatively high molecular weight rubber fraction is desired relative to the homopolymer molecular weight, it is necessary to remove a major portion of the hydrogen from the copolymer reactor. Hydrogen 39 is removed from the copolymer recycle gas 37 by a membrane separator 38 (e.g., Separex membrane separator). The gas stream, less the hydrogen removed, is recycled to the copolymer reactor via line 40, compressor 41 and is recycled either via line 42 or 43. An alternative method of removing hydrogen would be to strip the homopolymer powder being fed to the copolymer reactor with a portion of the propylene feed, which would be transferred back to the first stage homopolymer reactor (not shown in the drawing).

Copolymer powder is transferred from the copolymer reactor via line 44 and is combined with the fines purge 14 from the third stage reactor. The combined powder is transferred via line 45 to a solids classifier (not shown), where powder fines and monomers are separated overhead and recycled to the copolymer reactor. A course powder fraction is fed to final powder separation and stripping.

Course copolymer powder from the copolymer powder classifier is typically fed to a low pressure bag filter (not shown) where the bulk of the residual ethylene and propylene monomers are separated at typically about 25 psia, compressed, and recycled to the copolymer reactor. The separated powder is dropped by gravity through a rotary valve or feeder to the nitrogen stripper where the small amount of residual monomers are stripped countercurrently from the powder with nitrogen. The stripped copolymer powder is conveyed to the extruders for extrusion and pelleting. Alternatively, the powder can be sold directly.

EXAMPLE 1

The following example is based on a computer simulation for three cases. In Case 1, the process configuration consists of a gas phase fluidized bed reactor followed by a gas phase copolymer reactor. In Case 2 the configuration consists of a pipe-loop homopolymer reactor, followed by a fines separator and fines recycle back to the pipe loop reactor, a gas-phase fluidized bed homopolymer reactor, and a gas phase copolymer reactor. Case 3 is similar to Case 2 except that the fines are separated after the fluidized bed homopolymer reactor instead of before it. Conditions for the cases are described in the following table.

| Process Configuration | Percent of Total Rubber Contained in Particles With a Percent Rubber Content of Over 50% |
|---|---|
| Case 1 | |
| Fluidized bed homopolymer reactor + fluidized bed copolymer reactor. | 62% |
| Homopolymer reactor | |
| 120 minutes | |
| 70° C. | |
| 300 psia | |
| Copolymer Reactor | |
| 90 minutes | |
| 70° C. | |
| 66 psia ethylene | |
| 122 psia propylene | |
| Av. rubber content = 14.6%. | |
| Case 2 | |
| Pipe Loop Homopolymer reactor | 5% (None of the particles have |

| Process Configuration | Percent of Total Rubber Contained in Particles With a Percent Rubber Content of Over 50% |
|---|---|
| Fines separator, separating and recycling all fines with a ratio of less than 10,000 grams of polymer per gram of catalyst. Fluidized bed homopolymer reactor Fluidized bed copolymer reactor | a rubber content of over 54%) |
| Pipe Loop Reactor | |
| 10 minutes 67° C. 450 psia Catalyst particle diameter = 25 microns | |
| Separator | |
| Separate and recycle All particles with a diameter of less than 425 microns | |
| Fluidized Bed Homopolymer Reactor | |
| 15 minutes 70° C. 300 psia | |
| Fluidized Bed Copolymer Reactor | |
| 90 minutes 70° C. 53 psia ethylene 98 psia propylene 14.6% average rubber content | |
| Case 3 | |
| Similar to Case 2 except that fines are separated after the homopolymer reactor | 10% |

As can be seen from the examples above, in Case 1, 62% of the total rubber in the copolymer product is contained in particles with a rubber content of over 50%. In contrast, in Case 2, only 5% of the total rubber is contained in particles with a rubber content of over 50%, and none of the particles have a rubber content of over 54%. Case 3 is not quite as good as Case 2, but only 10% of the total rubber is contained in particles with greater than 50% rubber. Case 1 is not according to the invention, while Cases 2 and 3 are according to the invention.

EXAMPLE 2

In Example 2 four other computer simulations were run—Case 4 is not according to the invention, while Cases 5, 6 and 7 are variations of the present invention. The following summarizes the various cases:

| Process Configuration | Percent of Total Rubber Contained in Particles With a Percent Rubber Content of Over 50% |
|---|---|
| Case 4 | |
| Fluidized bed homopolymer reactor, fines separator with fines being recycled to F.B. homopolymer reactor, followed by fluidized bed copolymer reactor | 46% |
| Case 5 | |
| Two stage pipe loop liquid phase homopolymer reactors, fines separator with recycle to first stage pipe loop reactor, followed by F.B. homopolymer reactor and F.B. copolymer reactor [similar to Case 1 except that two pipe loop reactors are used] | 13% |
| Case 6 | |
| Similar to Case 5 except that the fines are combined with the copolymer product | 19% |
| Case 7 | |
| Similar to Case 6 except that the separator is located after the F.B. homopolymer reactor | 20% |

What is claimed is:

1. A continuous process for the preparation of propylene-ethylene impact copolymers comprising:
   (a) homopolymerizing propylene in one or more recirculating pipe-loop reactor(s) in the presence of a liquid medium or high density super-critical phase comprising propylene monomer as a major constituent and in the presence of magnesium chloride and titanium-containing catalyst particles, resulting in a homopolymer slurry;
   (b) transferring said homopolymer slurry to a separator and separating a fines stream having a particle size below about 30 times the diameter of the catalyst particles, resulting in a reduced-fines homopolymer slurry;
   (c) transferring said reduced-fines homopolymer slurry to a gas-phase fluidized bed homopolymer reactor and homopolymerizing additional propylene;
   (d) removing a stream of propylene homopolymer particles from said gas-phase fluidized bed homopolymer reactor and transferring the stream to a gas-phase fluidized bed copolymer reactor;
   (e) copolymerizing ethylene and propylene in said copolymer reactor, resulting in a propylene-ethylene impact copolymer; and
   (f) removing said propylene-ethylene impact copolymer as a product stream from said copolymer reactor.

2. The process of claim 1 wherein at least a portion of said fines stream is recycled to said pipe-loop reactor(s).

3. The process of claim 1 wherein at least a portion of said fines stream is recovered as a separate stream.

4. The process of claim 1 wherein at least a portion of said fines stream is combined with said impact copolymer product stream.

5. The process of claim 1 wherein said fines stream has a particle size below about 20 times the diameter of the catalyst particles.

6. The process of claim 1 wherein 50 to 95 weight percent of the homopolymer portion of the impact copolymer product is produced in said pipe loop reactor(s).

7. The process of claim 1 wherein only one pipe loop reactor is used.

8. A continuous process for the preparation of propylene-ethylene impact copolymers comprising:

(a) homopolymerizing propylene in one or more recirculating pipe-loop reactor(s) in the presence of a liquid medium or high density supercritical phase comprising propylene monomer as a major constituent and in the presence of magnesium chloride and titanium-containing catalyst particles, resulting in a homopolymer slurry;

(b) transferring said homopolymer slurry to a gas-phase fluidized bed homopolymer reactor and homopolymerizing additional propylene;

(c) removing a stream of propylene homopolymer particles from said gas-phase fluidized bed homopolymer reactor, transferring the stream to a separator and separating a fines stream having a particle size below about 30 times the diameter of the catalyst particles, resulting in a reduced-fines homopolymer slurry;

(d) transferring said reduced-fines homopolymer slurry to a gas-phase fluidized bed copolymer reactor;

(e) copolymerizing ethylene and propylene in said copolymer reactor, resulting in a propylene-ethylene impact copolymer; and (f) removing said propylene-ethylene impact copolymer as a product stream from said copolymer reactor.

9. The process of claim 8 wherein at least a portion of said fines stream is recycled to said pipe-loop reactor(s).

10. The process of claim 8 wherein at least a portion of said fines stream is recycled to said gas-phase fluidized bed homopolymer reactor.

11. The process of claim 8 wherein at least a portion of said fines stream is combined with said impact copolymer product stream.

12. The process of claim 8 wherein said fines stream has a particle size below about 20 times the diameter of the catalyst particles.

13. The process of claim 8 wherein 50 to 95 weight percent of the homopolymer portion of the impact copolymer product is produced in said pipe loop reactor(s).

14. The process of claim 8 wherein only one pipe loop reactor is used.

15. The process of claim 1 wherein a portion of propylene monomer vaporized in the gas-phase fluidized bed homopolymer reactor is removed, condensed and recycled to said pipe-loop reactor(s).

16. The process of claim 8 wherein a portion of propylene monomer vaporized in the gas-phase fluidized bed homopolymer reactor is removed, condensed and recycled to said pipe-loop reactor(s).

* * * * *